US010302472B1

(12) United States Patent
Holmes et al.

(10) Patent No.: US 10,302,472 B1
(45) Date of Patent: May 28, 2019

(54) GUSSETED PRESSURE METER

(71) Applicant: McCrometer, Inc., Hemet, CA (US)

(72) Inventors: Matt Holmes, Winchester, CA (US); Ryan Chavez, Encinitas, CA (US); Mohammad Aladdasi, Hemet, CA (US); Mike Dyer, San Jacinto, CA (US); Gatlan Haddon, Aguanga, CA (US); Dillon Blaine, Redlands, CA (US)

(73) Assignee: MCCROMETER, INC., Hemet, CA (US)

( * ) Notice: Subject to any disclaimer, the term of this patent is extended or adjusted under 35 U.S.C. 154(b) by 0 days.

(21) Appl. No.: 15/823,128

(22) Filed: Nov. 27, 2017

(51) Int. Cl.
  *G01F 1/40* (2006.01)
  *G01F 1/37* (2006.01)
(52) U.S. Cl.
  CPC . *G01F 1/40* (2013.01); *G01F 1/37* (2013.01)
(58) Field of Classification Search
  CPC .................................................. G01F 1/37
  See application file for complete search history.

(56) References Cited

U.S. PATENT DOCUMENTS

| | | | |
|---|---|---|---|
| 8,596,141 B2 * | 12/2013 | Konyukhov | G01F 1/3209 73/861.24 |
| 9,267,830 B2 * | 2/2016 | Rasche | F16L 3/237 |
| 9,592,963 B2 * | 3/2017 | Koenig | F16K 3/02 |
| 2007/0113645 A1 * | 5/2007 | Summer | G01F 23/64 73/293 |

* cited by examiner

*Primary Examiner* — Jewel V Dowtin
(74) *Attorney, Agent, or Firm* — Ference & Associates LLC

(57) ABSTRACT

An embodiment provides an apparatus, including: a pressure meter having a first end section and a second end section substantially opposite the first end section; at least a first set of gussets, wherein each of the gussets of the first set comprise a first end mechanically coupled to the first end section and a second end that facilitates mechanical connection to the inside of a fluid conveyance object; at least a second set of gussets, wherein each of the gussets of the second set comprise a first end mechanically coupled to the second end section and a second end that facilitates mechanical connection to the inside of the fluid conveyance object; and at least one sensor operatively coupled to the pressure meter. Other aspects are described and claimed.

20 Claims, 4 Drawing Sheets

GUSSETED PRESSURE METER

BACKGROUND

Knowing the velocity of a fluid (e.g., gas, liquid, slurry, etc.) through a fluid conveyance object (e.g., pipe, tube, etc.) is very useful in different situations. For example, a manufacturer may want to know how fast a fluid is traveling through a pipe to make sure that the fluid is being applied at a predetermined thickness. As another example, an engineer may want to know how fast and the direction that a fluid is traveling through a pipe to ensure that the pipe is structurally sufficient to withstand the velocity and amount of fluid traveling through the pipe. Additionally, knowing the velocity of the fluid can allow a person to calculate other attributes related to the fluid.

Measuring the velocity of a fluid within a fluid conveyance object may be difficult or impractical. For example, directly measuring the speed of a fluid through a pipe may be very difficult due to the necessity of reference points, multiple measurement devices, and the like. Thus, one way that velocity is measured is through an indirect measurement, for example, by measuring a differential pressure between two points within the fluid conveyance object. However, in order to accurately calculate the velocity, the pressure between the two points must be different. Accordingly, pressure meters used to measure pressure in fluid conveyance objects are typically designed so as to cause the velocity of the fluid to increase when moving around the meter.

The pressure of the fluid is measured before the fluid encounters the meter. The pressure meter then measures the pressure of the fluid at the end of the meter. In other words, the pressure of the fluid is measured at a point before the fluid encounters the meter and is then measured after the fluid has encountered the meter. The speed of the fluid has to increase in order to move around the meter, which causes a proportional drop in the pressure. Therefore, once the differential pressure has been determined, by comparing the pressure of the fluid before encountering the meter with the pressure of the fluid after encountering the fluid, the velocity of the fluid through the fluid conveyance object can be determined. Thus, the pressure meter provides a technique for indirectly measuring the velocity of the fluid in the fluid conveyance object.

BRIEF SUMMARY

One embodiment provides an apparatus, comprising: a pressure meter having a first end section and a second end section substantially opposite the first end section; at least a first set of gussets, wherein each of the gussets of the first set comprise a first end mechanically coupled to the first end section and a second end that facilitates mechanical connection to the inside of a fluid conveyance object; at least a second set of gussets, wherein each of the gussets of the second set comprise a first end mechanically coupled to the second end section and a second end that facilitates mechanical connection to the inside of the fluid conveyance object; and at least one sensor operatively coupled to the pressure meter.

Another embodiment provides a pressure meter, comprising: a conical shaped pressure meter having a first end section and a second end section substantially opposite the first end section, wherein the first end section is located at the smaller end of the conical shape and wherein the second end section is located at the larger end of the conical shape; a first set of gussets comprising three gussets, wherein each of the three gussets of the first set comprises a first end mechanically connected to the first end section and a second end that facilitates mechanical connection to the inside of a fluid conveyance object and wherein the three gussets of the first set are substantially equidistantly spaced; a second set of gussets comprising three gussets, wherein each of the three gussets of the second set comprises a first end mechanically connected to the second end section and a second end that facilitates mechanical connection to the inside of a fluid conveyance object and wherein the three gussets of the second set are substantially equidistantly spaced; wherein at least one of: the gussets of the first set and the gussets of the second set is angled with respect to the conical shaped pressure meter; at least one pressure sensor located at the larger end of the conical shape, and wherein the pressure sensor measures a pressure at the larger end of the conical shape.

A further embodiment provides a pressure meter system, comprising: a section of piping; a conical shaped pressure meter located within the section of piping; the conical shaped pressure meter having a first end section and a second end section substantially opposite the first end section, wherein the first end section is located at the smaller end of the conical shape and wherein the second end section is located at the larger end of the conical shape; a first set of gussets, wherein each of the gussets of the first set comprises a first end mechanically connected to the first end section and a second end mechanically connected to the inside of the section of piping; a second set of gussets, wherein each of the gussets of the second set comprises a first end mechanically connected to the second end section and a second end mechanically connected to the inside of the section of piping; and at least one pressure sensor located at the larger end of the conical shape, wherein the pressure sensor measures a pressure at the larger end of the conical shape.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
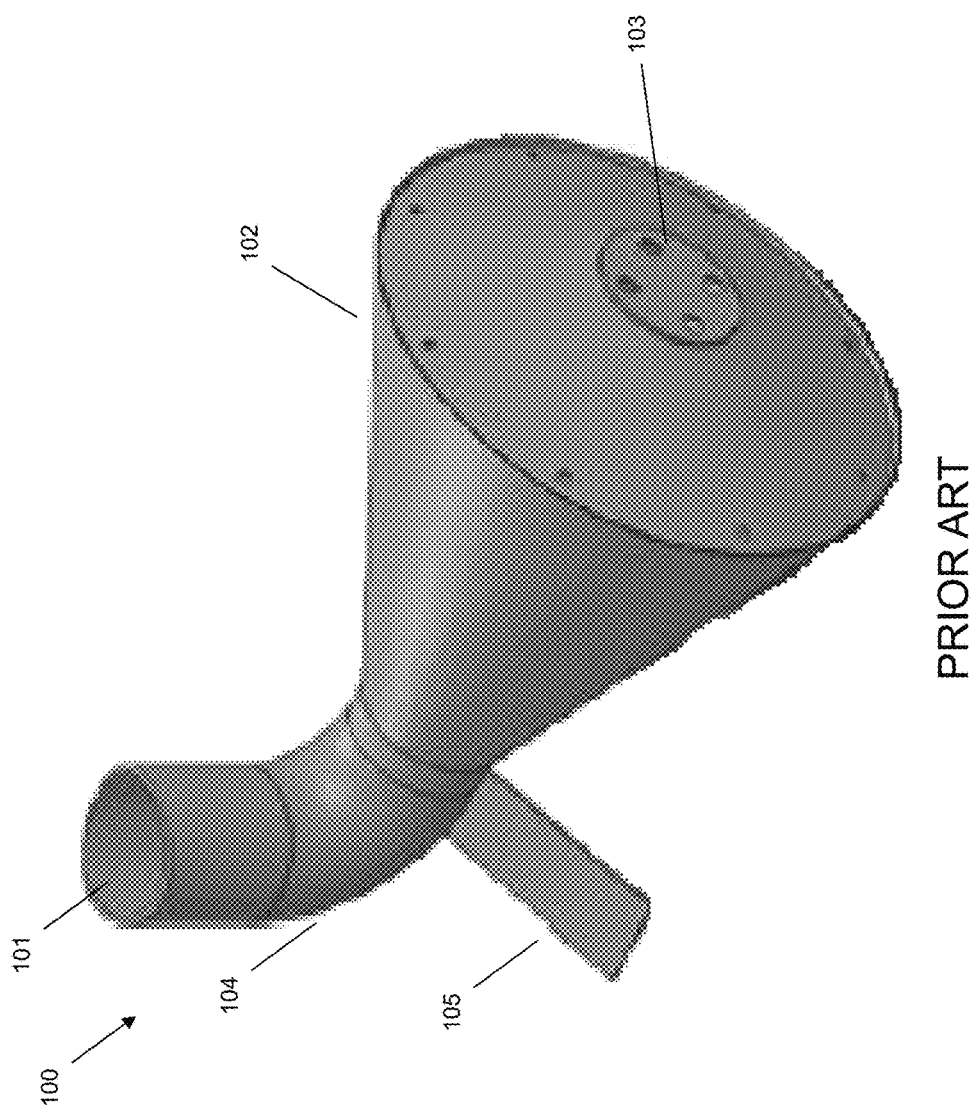
FIG. 1 illustrate an example of a conventional (prior art) pressure meter.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Pressure meters used to measure pressure in a fluid conveyance object are generally designed as an obstruction within the fluid conveyance object (e.g., tube, pipe, etc.). To increase readability, the term pipe will be used here throughout. However, it should be understood that the pressure meter as described herein can be used in any type of fluid conveyance object may be used. In other words, the pressure meters are generally in-line with the fluid within the pipe or the path of fluid travel. This is because in order to calculate the velocity of the fluid, a differential pressure is needed. The differential pressure is caused by the pressure meter acting as an obstruction within the pipe. Due to the Bernoulli principle, the obstruction causes the speed of the fluid to increase when the obstruction is encountered. Thus, these pressure meters are generally shaped to emphasize this increase in speed of the fluid, for example, as a v-cone or conical shaped device, where the smaller end of the device is the proximal end with respect to direction of travel of the fluid and the larger end of the device is the distal end with respect to the direction of travel of the fluid. In other words, the smaller end is the first end that a fluid encounters and the larger end is the last end that the fluid encounters.

The pressure of the fluid is measured at some point before the location of the pressure meter. The pressure of the fluid is measured again after the fluid traverses the pressure meter, which is usually the larger end of the pressure meter. When the speed of the fluid increases to traverse the pressure meter, the pressure drops proportionally. Thus, the measured pressure of the fluid after traversing the pressure meter will be lower than the pressure measured before encountering the pressure meter, resulting in a differential pressure. This differential pressure can then be used to calculate the velocity of the fluid within the pipe. In other words, there is a correlation between differential pressure and velocity and velocity can be calculated from differential pressure.

In order for the pressure meter to be in the fluid path, the pressure meter is attached to the inside of the pipe or attached within a section of piping that is then put in-line with the other piping. The pressure meters generally have an opening that connects to the wall of the pipe and that allows communication of the signal measured by the pressure meter to another device, for example, through a tap in the pipe wall. For example, referring to FIG. 1, which illustrates a conventional pressure meter system 100, the opening 101 would be attached the pipe wall, usually through a tap in the pipe wall. The pressure sensor, generally located at or near the center of the large end 103 of the conical pressure meter 102 communicates the signal through the pressure meter system to the opening via structural supports, for example, an elbow 104 connecting the opening piece to the conical pressure meter 102. Alternatively, the system may include pressure ports that are located in the pipe wall, for example, as wall tap pressure ports, that are located upstream and downstream of the pressure meter. These wall tap pressure ports then measure the pressure at these upstream and downstream locations. To provide additional stability to the pressure meter system 100, the pressure meter system 100 is mechanically connected to the inside of the pipe using gussets 105. In conventional systems and as shown in FIG. 1, these gussets are flat plate gussets.

As the size of the pressure meter increases, the support structures (e.g., the gussets) become less adequate. Specifically, as the size of the pressure meter increases, the pressure meter is prone to achieve resonance at lower vibrational frequencies. Unfortunately, it has been found that the vibrational resonance frequency of the conventional pressure meter systems can be around 60 Hz, which is a very common operating frequency of equipment commonly found in locations near the pressure meter (e.g., generators, compressors, pumps, etc.). As the equipment operates at these frequencies, the pressure meter starts to vibrate, sway, and become unstable. The vibration of the pressure meter may also cause turbulence in the fluid being conveyed through the pipe, which may cause other issues. Additionally, it has been found that the gussets of conventional systems do not provide the most structural support. Rather, it has been found that the elbow and piping attached to the tap in the pipe wall for communication of the pressure signal provides most of the structural support for the pressure meter system. This puts stress and tension on these components which can cause failure of the pressure meter system.

The illustrated example embodiments will be best understood by reference to the figures. The following description is intended only by way of example, and simply illustrates certain example embodiments.

Figure 2:
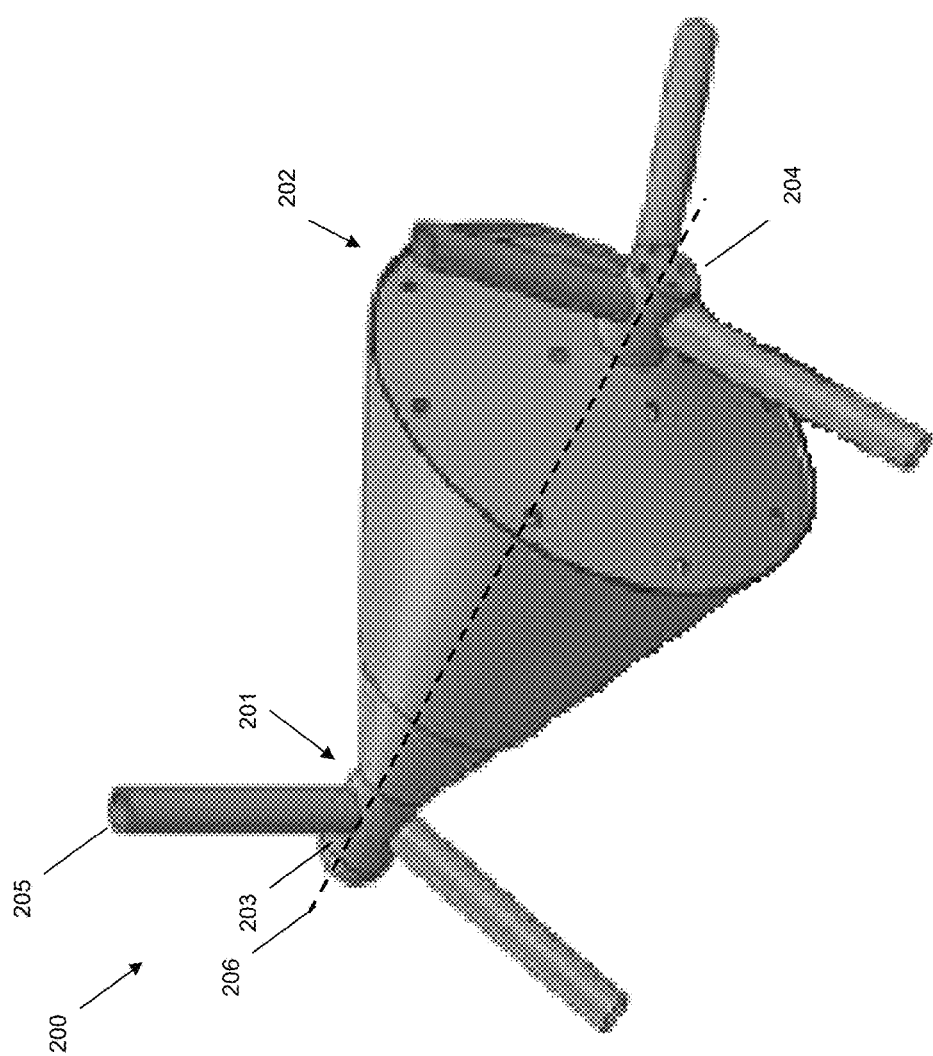
FIG. 2 illustrates an example pressure meter located within a fluid conveyance object.

Accordingly, an embodiment provides a pressure meter having a more stable structural design that results in a vibrational resonance frequency that is higher than 60 Hz, for example, an embodiment may result in a resonance frequency greater than 200 Hz. FIG. 2 illustrates an example embodiment of the new pressure meter design. The pressure meter as illustrated in FIG. 2 is merely an example, different shapes and configurations of the pressure meter or components thereof may be used as practical.

As with a conventional pressure meter, the pressure meter 200 may be a conical shaped pressure meter and may include one or more pressure sensors or pressure ports for measuring pressure of the fluid. The pressure sensors or pressure ports may include any suitable sensor for measuring pressure, for example, piezoelectric sensors, capacitive sensors, electromagnetic sensors, or the like. As with a conventional pressure meter, the pressure sensors and/or pressure ports may be located at the larger end 202 of the pressure meter 200. In this example, the pressure sensors and/or pressure ports may be located in one of the end sections of the pressure meter 200, for example, the second end section 204, as described in more detail herein. The pressure sensors may also be located at the other end of the pressure meter, for example, to measure the starting pressure of the fluid through the pipe. Additionally, the pressure meter may include two or more sets of pressure sensors, with one set being located at one end of the pressure meter and the other set being located at the other end of the pressure meter.

The pressure meter 200 includes a first end section 203 and a second end section 204 that is substantially opposite the first end section. In other words, the second end section 204 is located at the opposite end of the pressure meter 200 as the first end section 203. The terms "first end section" and "second end section" are merely used to describe a number of ends. In other words, in use the end section labeled as 203 may be the second end section and the end section labeled as 204 may be the first end section. However, for purposes of readability the end section labeled as 203 will be referred to as the first end section and the end section labeled as 204 will be referred to as the second end section. In other words, the end section near the small end 201 of the pressure meter 200 will be referred to herein as the first end section and the end section near the large end 202 of the pressure meter 200 will be referred to herein as the second end section. As shown in FIG. 2, one or both of the end sections may protrude from a face of the pressure meter, thereby allowing connection of the gussets, as discussed in more detail below.

The apparatus also includes a plurality of gussets 205 which are divided into two sets of gussets, where each set of gussets is mechanically connected to one of the end sections. In other words, the gussets are divided into two sets and one set of gussets is attached to one end of the pressure meter's horizontal support and the other set of gussets is attached to the other end of the pressure meter's horizontal support. Each of the gussets includes a first end that is mechanically coupled to the pressure meter and a second end that facilitates mechanical connection to the inside of a fluid conveyance object. For example, the first end of a first set of gussets is mechanically coupled to the first end section 203 of the pressure meter 200 and the first end of the second set of gussets is mechanically coupled to the second end section 204 of the pressure meter 200. The gussets may be mechanically coupled using any mechanical coupling techniques, for example, welding, press-fitted, using a coupling element (e.g., screw, bolt, rivet, etc.), forged or otherwise manufactured as a single piece with the end section, or the like.

The gussets 205 show in FIG. 2 are illustrated as tubular gussets, specifically, a gusset having a hollow center and a circular cross-section. However, the gussets may be of any typical gusset shape, for example, square tubing (i.e., a gusset having a hollow center and a square internal shape and a square external shape), a flat plate gusset (for example, as shown at 105 in FIG. 1), a solid gusset (e.g., a cylindrical gusset having a solid center, a rectangular gusset having a solid center, etc.), or another other type of gusset (e.g., a tubular gusset having a triangular shape, a solid gusset having a octagonal shape, etc.). A tubular gusset may have some advantages over other shapes due to the structural strength of a cylindrical design, specifically with respect to forces that are applied in a perpendicular manner to the side of the gusset. However, not all pressure meter designs may be subjected to such forces, so other gusset shapes may be adequate for structural stability in different applications.

For ease of illustration an imaginary dotted line has been included on FIG. 2 to represent a horizontal centerline 206 that connects the center of the first end section 203 and the center of the second end section 204. Thus, the first end section and the second end section may be located at substantially the horizontal centerline 206 of the pressure meter 200. The gussets may be mechanically coupled substantially perpendicularly to the horizontal centerline 206 of the pressure meter. This does not preclude that the gussets may be angled with respect to the pressure meter, as discussed in more detail below. Rather, the illustration is that the gussets are in a direction roughly perpendicular to the horizontal centerline 206, rather than a direction parallel to the horizontal centerline 206. In other words, the gussets are not necessarily at a 90° angle with respect to the horizontal centerline 206. Rather, the gussets are more perpendicular with respect to the horizontal centerline 206 than parallel to the horizontal centerline 206.

Each set of gussets may include one or more gussets. In other words, the set of gussets may include one, two, three, or more gussets. Additionally, the number of gussets in each set does not have to be equal to the number of gussets in the other set. In other words, one set of gussets may have one gusset, where the other set of gussets has three gussets. As illustrated in FIG. 2, each set may include three gussets. Three gussets in each set may provide an advantage in certain applications. Specifically, if, in the identified application, the pressure meter may be subjected to forces in any direction or plane with respect to the pressure meter, the inclusion of three gussets within each set may provide structural stability regardless of the direction or plane of force. In other words, three gussets allow for no planes of resonant frequency, whereas a fewer number would allow for at least one plane of resonant frequency. Additionally, using a number greater than three may not provide any resonant frequency advantages over three gussets that are equidistant from each other. However, as indicated above, the number of gussets may be any number and different numbers of gussets may provide advantages in different applications. In the case of more than one gusset, the gussets may be located substantially equidistant from each other. In other words, the distance between each of the gussets to another gusset within the set may be a distance substantially equal to the distance between other gussets within the set.

The gussets may also be angled with respect to the pressure meter. For example, the gussets may be angled inwardly or outwardly with respect to the pressure meter. Both sets of gussets do not have to be either angled at all or angled in the same direction. In other words, one set of gussets may not be angled with respect to the pressure meter (e.g., the gussets are located at a 90° angle with respect to the horizontal centerline 206, etc.), one set of gussets may be angled inwardly with respect to the pressure meter while the other set of gussets is angled outwardly with respect to the pressure meter, and the like. Additionally, each gusset within the set does not have to be angled or angled in the same direction as the other gussets within the set. For example, one gusset in the set may not be angled, one gusset in the same set may be angled inwardly with respect to the pressure meter, and one gusset in the same set may be angled outwardly with respect to the pressure meter. The angle of the gussets may be a slight angle, for example, 5°, or may be a more substantial angle, for example, 45°. Angling at least one gusset or one set of gussets may provide an advantage against forces parallel to the pressure meter. For example, some forces may cause the pressure meter to sway back and forth (e.g., parallel with the horizontal centerline 206), causing axial tension or pressure. Angling at least one of the gussets may prevent or reduce the ability for the pressure meter to sway in this direction.

Figure 3:
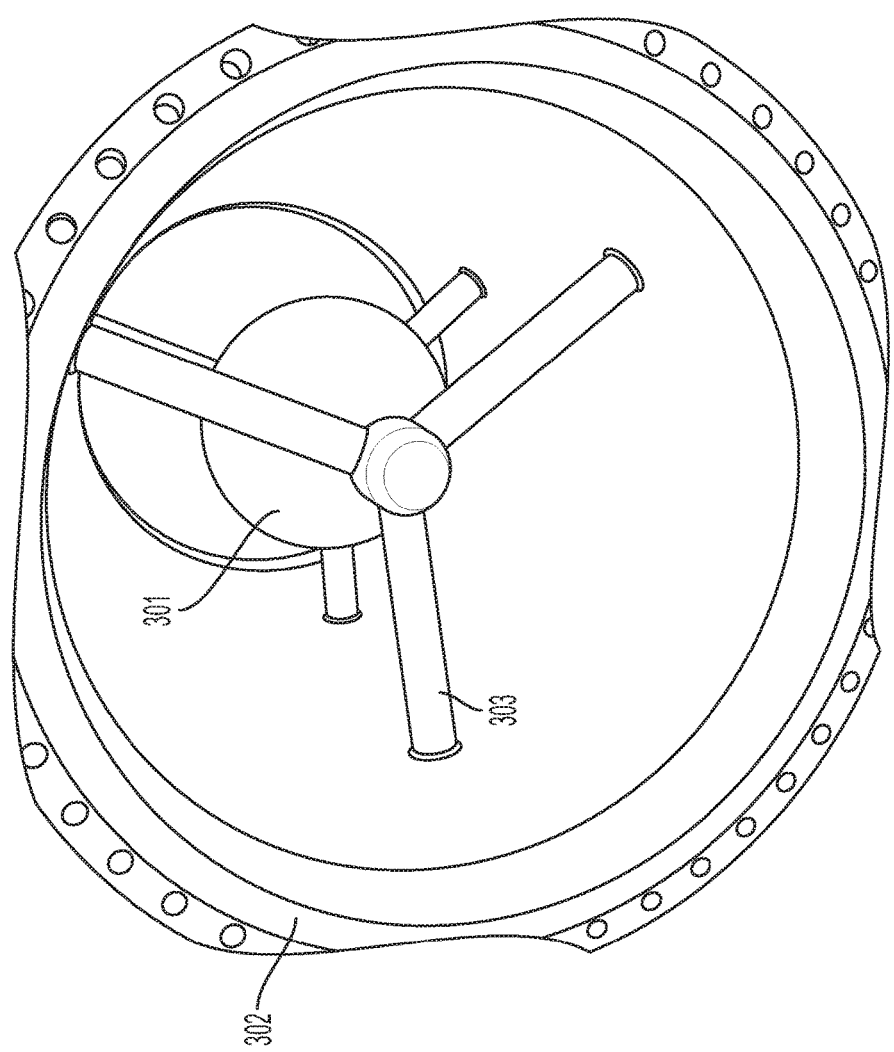
FIG. 3 illustrates an example pressure meter.

The pressure meter may be mechanically coupled to a pipe or section of pipe, as illustrated in FIG. 3. The pressure meter 301 is connected to the wall of a pipe 302 using the gussets 303. The pipe may be of any diameter. However, the use of the described pressure meter in pipes smaller than 18" may not be cost effective. Welding or otherwise attaching the pressure meter with the number of gussets may be difficult in a pipe having a diameter of smaller than 18". Additionally, the cost of the described pressure meter may be greater than conventional pressure meters and the conventional pressure meters at smaller sizes have higher resonant frequencies. Therefore, the need for the described pressure meter in pipes smaller than 18" may be smaller than in the larger pipes. However, certain applications may require or benefit from the use of the described pressure meter in pipes smaller than 18". Thus, the pressure meter can be sized and fitted in pipes smaller than 18" if needed.

As discussed before, the pressure signal from the pressure sensor or pressure port may be sent through the pressure meter through a gusset and through a wall tap within the pipe wall. Thus, one or more of the gussets of the described pressure meter may be attached to the wall of the pipe at a location including a wall tap for obtaining or receiving the pressure signal. In the case of the described pressure sensor, a wall tap may be provided at each gusset location. A signal from one or more pressure sensors may then be provided to each wall tap. Such a system allows redundancy and a check between the signals received at the wall tap. For example, the system may implement a voting scheme, an auctioneer scheme, majority scheme, or other type of scheme for determining the actual pressure signal. As an example, if four of the six signals match, the system may determine that the two remaining signals should be ignored. Such a system provides reassurance to an operator or receiver of the information that the information is accurate and correct.

The pressure signal may be transmitted through the wall tap or from a processor or component of the wall tap to a remote system. The remote system may then use the information to calculate the desired fluid attribute, for example, the velocity of the fluid. The pressure sensor system and/or remote system may use circuits, circuitry, or components as illustrated in FIG. 4.

Figure 4:
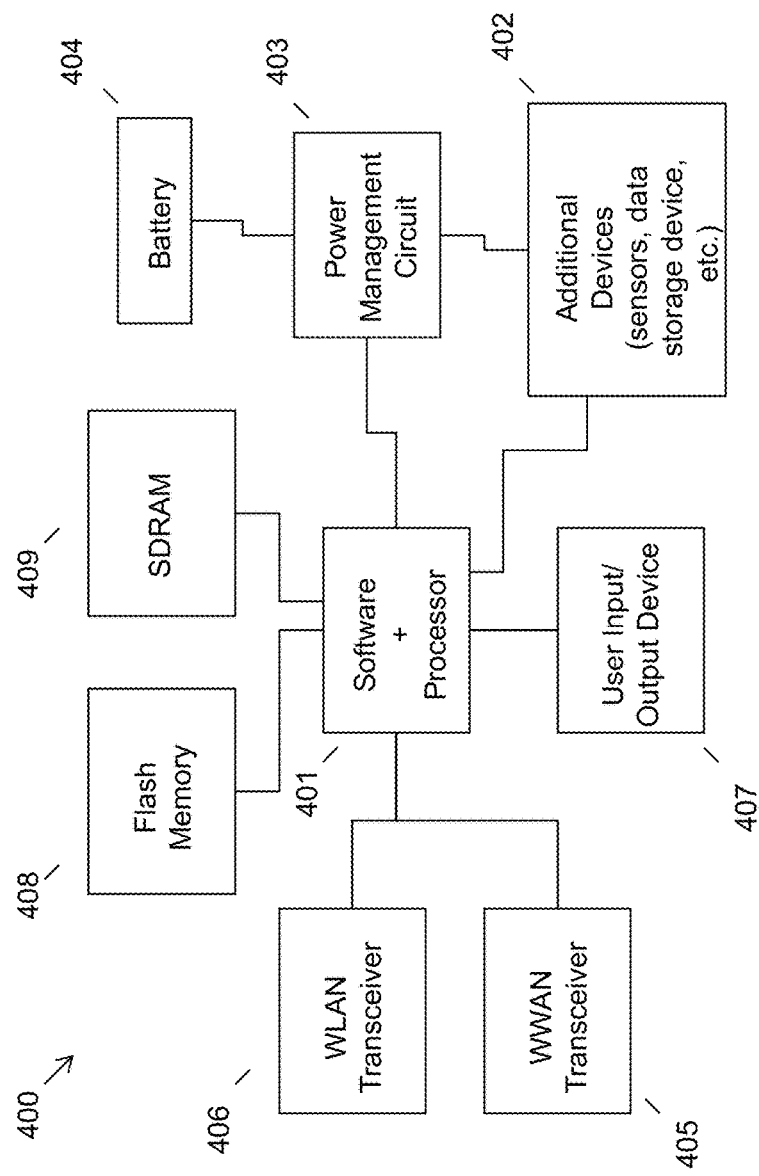
FIG. 4 illustrates an example of computer circuitry.

While various other circuits, circuitry or components may be utilized in information handling devices, with regard to an instrument for measuring fluid level and velocity according to any one of the various embodiments described herein, an example is illustrated in FIG. 4. For example, the device circuitry 400 as illustrated in FIG. 4 may be used within the pressure meter to measure the pressure of the fluid. The device circuitry 400 may also be incorporated across multiple components of a larger system. For example, the components within or connected to the pressure meter may include a portion of the components of FIG. 4, while another remote device may include other components illustrated in FIG. 4, for example, the device illustrated in FIG. 4 may include a particular computing platform (e.g., mobile computing, desktop computing, etc.) including software and processor(s) may be combined in a single chip 401. Processors comprise internal arithmetic units, registers, cache memory, busses, I/O ports, etc., as is well known in the art. Internal busses and the like depend on different vendors, but essentially all the peripheral devices (402) may attach to a single chip 401. The circuitry 400 may combine the processor, memory control, and I/O controller hub all into a single chip 410. Common interfaces may include SPI, I2C and SDIO.

There are power management chip(s) 403, e.g., a battery management unit, BMU, which manage power as supplied, for example, via a rechargeable battery 404, which may be recharged by a connection to a power source (not shown). In at least one design, a single chip, such as 401, is used to supply BIOS like functionality and DRAM memory.

System 400 typically includes one or more of a WWAN transceiver 405 and a WLAN transceiver 406 for connecting to various networks, such as telecommunications networks and wireless Internet devices, e.g., access points. Additionally, devices 402 are commonly included, e.g., sensors (e.g., pressure sensor), data storage devices (e.g., external hard drive, local hard drive, cloud storage, etc.), and the like. System 400 includes input/output devices 407 for data input and display/rendering (e.g., a computing location located away from the single beam system that is easily accessible by a user). System 400 also typically includes various memory devices, for example flash memory 408 and SDRAM 409.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as an instrument, system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   a pressure meter having a first end section and a second end section substantially opposite the first end section;
   at least a first set of gussets, wherein each of the gussets of the first set comprise a first end mechanically coupled to the first end section and a second end that facilitates mechanical connection to the inside of a fluid conveyance object;
   at least a second set of gussets, wherein each of the gussets of the second set comprise a first end mechanically coupled to the second end section and a second end that facilitates mechanical connection to the inside of the fluid conveyance object; and
   at least one sensor operatively coupled to the pressure meter.

2. The apparatus of claim 1, wherein at least one of: the first set of gussets and the second set of gussets is angled outwardly with respect to the pressure meter.

3. The apparatus of claim 1, wherein at least one of: the first set of gussets and the second set of gussets is angled inwardly with respect to the pressure meter.

4. The apparatus of claim 1, wherein the pressure meter comprises a conical shaped pressure meter.

5. The apparatus of claim 1, wherein at least one of the gussets of the first set or the second set comprises a gusset type selected from the group consisting of: a tubular gusset, a plate gusset, a square tubular gusset, and a solid gusset.

6. The apparatus of claim 1, wherein each of the first set of gussets and the second set of gussets comprise at least two gussets.

7. The apparatus of claim 1, wherein the at least one sensor is located at one of the: first end section and the second end section.

8. The apparatus of claim 1, wherein both the first end section and the second end section are located at substantially the horizontal centerline of the pressure meter.

9. The apparatus of claim 1, wherein at least one of the first end section and the second end section protrudes from a face of the pressure meter.

10. The apparatus of claim 1, wherein at least one of: the first set and the second set comprise three gussets substantially equidistantly spaced.

11. The apparatus of claim 1, wherein the gussets of the first set and the gussets of the second set are mechanically coupled substantially perpendicularly to a horizontal centerline of the pressure meter.

12. A pressure meter, comprising:
   a conical shaped pressure meter having a first end section and a second end section substantially opposite the first end section, wherein the first end section is located at the smaller end of the conical shape and wherein the second end section is located at the larger end of the conical shape;
   a first set of gussets comprising three gussets, wherein each of the three gussets of the first set comprises a first end mechanically connected to the first end section and a second end that facilitates mechanical connection to the inside of a fluid conveyance object and wherein the three gussets of the first set are substantially equidistantly spaced;
   a second set of gussets comprising three gussets, wherein each of the three gussets of the second set comprises a first end mechanically connected to the second end section and a second end that facilitates mechanical connection to the inside of a fluid conveyance object and wherein the three gussets of the second set are substantially equidistantly spaced;
   wherein at least one of: the gussets of the first set and the gussets of the second set is angled with respect to the conical shaped pressure meter; and
   at least one pressure sensor located at the larger end of the conical shape, wherein the pressure sensor measures a pressure at the larger end of the conical shape.

13. The pressure meter of claim 12, wherein at least one of the gussets of the first set or the second set comprises a gusset type selected from the group consisting of: a tubular gusset, a plate gusset, a square tubular gusset, and a solid gusset.

14. The pressure meter of claim 12, wherein the angle with respect to the conical shaped pressure meter comprises an angle selected from the group consisting of: angled outwardly with respect to the conical shaped pressure meter and angled inwardly with respect to the conical shaped pressure meter.

15. The pressure meter of claim 12, wherein the other of the at least one of: the gussets of the first set and the gussets of the second set is not angled with respect to the conical shaped pressure meter.

16. The pressure meter of claim 12, wherein at least one of the first end section and the second end section protrudes from a face of the pressure meter.

17. The pressure meter of claim 12, wherein the gussets of the first set and the gussets of the second set are mechanically coupled substantially perpendicularly to a horizontal centerline of the pressure meter.

18. A pressure meter system, comprising:
   a section of piping;
   a conical shaped pressure meter located within the section of piping;
   the conical shaped pressure meter having a first end section and a second end section substantially opposite the first end section, wherein the first end section is located at the smaller end of the conical shape and wherein the second end section is located at the larger end of the conical shape;
   a first set of gussets, wherein each of the gussets of the first set comprises a first end mechanically connected to the first end section and a second end mechanically connected to the inside of the section of piping;
   a second set of gussets, wherein each of the gussets of the second set comprises a first end mechanically connected to the second end section and a second end mechanically connected to the inside of the section of piping; and
   at least one pressure sensor located at the larger end of the conical shape, wherein the pressure sensor measures a pressure at the larger end of the conical shape.

19. The pressure meter system of claim 18, wherein a location of the piping section where at least one of the gussets of the first set or of the second set mechanically connects to the piping section comprises a tap facilitating communication of a signal generated by the at least one pressure sensor to at least one remote system.

20. The pressure meter system of claim 18, wherein the second end section protrudes from a face of the pressure meter.

\* \* \* \* \*